June 6, 1950 E. W. MARLOWE 2,510,316
EMERGENCY BREAK-IN SYSTEM FOR CHANNEL COMMUNICATION SYSTEMS
Filed May 18, 1948
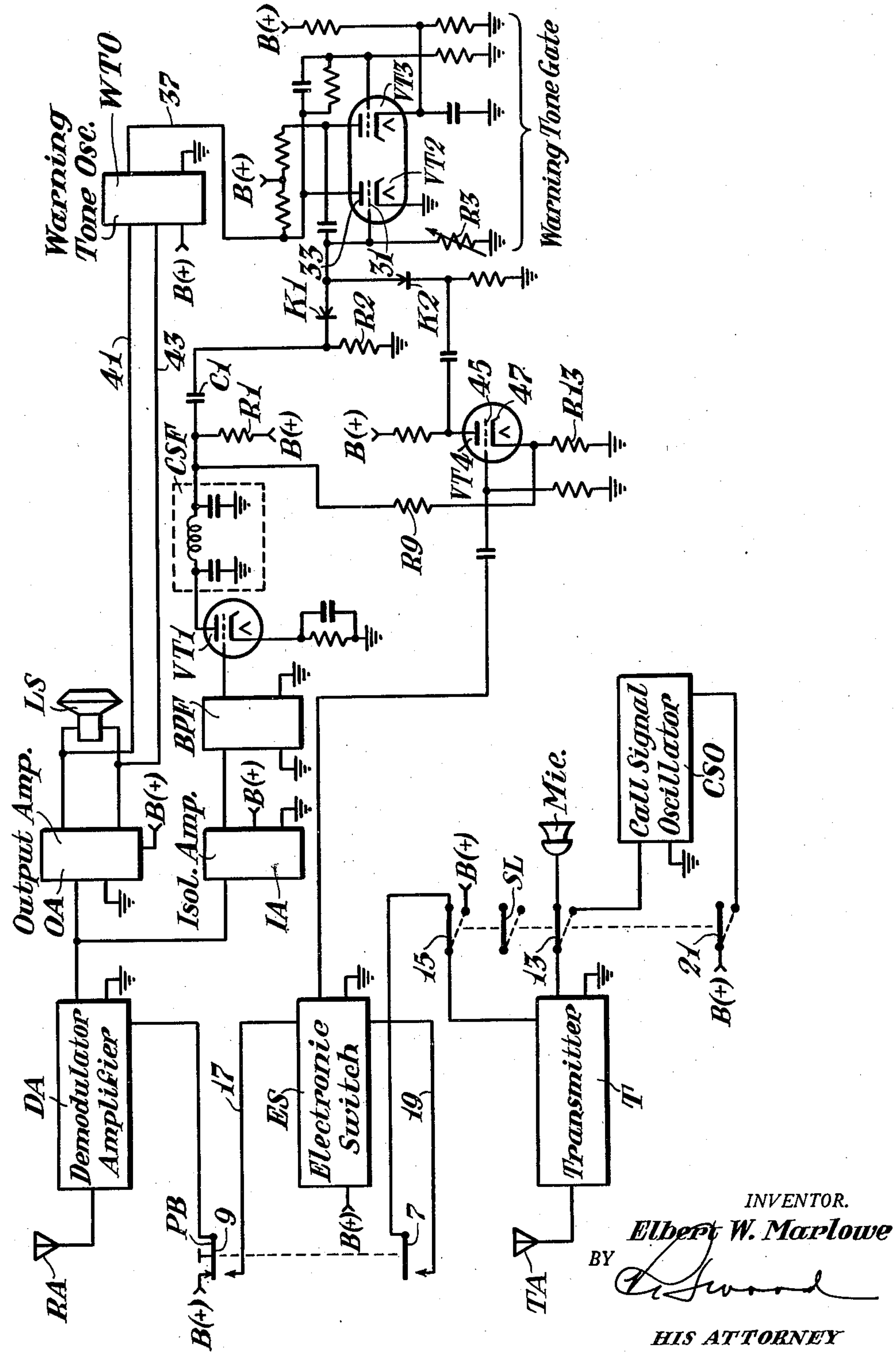
INVENTOR.
Elbert W. Marlowe
BY
HIS ATTORNEY Patented June 6, 1950 2,510,316

UNITED STATES PATENT OFFICE 2,510,316

EMERGENCY BREAK-IN SYSTEM FOR CHANNEL COMMUNICATION SYSTEMS

Elbert W. Marlowe, Wilkinsburg, Pa., assignor to The Union Switch & Signal Company, Swissvale, Pa., a corporation of Pennsylvania Application May 18, 1948, Serial No. 27,742

7 Claims. (Cl. 250—13)

My invention relates to communication systems of the type employing a single frequency channel for transmission and reception, and particularly to an improved system of the type described providing for an emergency break-in operation.

When a communication system utilizes a single frequency channel for transmission and reception to which access may be had at any time by a station desiring to transmit, it will be apparent that another station is unable to communicate with the station which is transmitting. That is, communication systems of this type are usually operated on a "push-to-talk" basis, and during the time a station is transmitting its receiving equipment is rendered inactive, and vice versa. Thus a station which is transmitting cannot hear an incoming message since its receiver is cut off during the time the transmitting equipment is retained in its active condition.

Such types of single channel communication systems are often used where the receivers of all the stations of the system are retained active during non-communication periods ready to receive a message and a call sent out by any station is picked up by all of the other stations. For example, such communication systems are used on aircraft, for railway train communications, etc. It is quite often necessary for a station to send out an emergency message that should be received without delay by all of the other stations, at least those stations within the usual range of transmission. With the "push-to-talk" arrangement heretofore used, a calling station has no way to break in on a station whose transmitter is switched to an active condition and this station will not receive emergency messages.

Accordingly, an object of my invention is to provide an emergency calling system for single frequency channel communication systems.

Another object of my invention is to provide an emergency calling system for single frequency channel communication systems in which the transmitter and receiver are alternately rendered active at unequal intervals at a sub-audible rate to provide recurrent transmission and reception.

A further object of my invention is to provide an emergency calling system for a single frequency channel communication system in which the transmitter and receiver of a particular station are alternatingly switched on and off for unequal intervals during such times as the station is transmitting.

Another object of my invention is to provide an emergency calling system for a single frequency channel communication system in which the transmitter and receiver of a particular station are alternately switched on and off for unequal intervals during such times as the station is transmitting, and the receiver of this station is provided with emergency call signal detecting means, responsive to an incoming emergency break-in signal, which causes the generation of a warning signal which is supplied to the sound reproducing means located at the station.

Other objects of my invention and features of novelty therein will be apparent from the following description taken in connection with the accompanying drawing.

In practicing my invention, I provide at each station in a communication system employing a single frequency channel, means effective when the station is transmitting for recurrently deactivating the transmitter and activating the receiver for a relatively short time interval. Thus during transmission, intervals are provided during which an incoming signal may be received, but these intervals during which the transmission is cut off are short enough so that the brief interruptions will not be detected by the person listening at the receiving station, due to the phenomenon of "persistence of hearing." Since the periods during which the receiver is active are comparatively short, an incoming signal from another station usually could not be heard at the transmitting station, especially if the equipment is located in noisy surroundings such as in the cab of a locomotive or in an airplane. Accordingly, I provide means at each station for transmitting a distinctive call signal, means for detecting such a call signal, and means governed by the call detecting means for generating a warning tone which may be heard by the operator at the transmitting station in the loud-speaker or other sound reproducer usually provided in such systems.

I shall describe one form of communication system embodying my invention and shall then point out the novel features thereof in claims.

The accompanying drawing is a diagrammatic view showing a preferred embodiment of my invention. It is to be understood that although the apparatus is shown and described in connection with a space radio system, it is readily adaptable to carrier current communication or inductive communication systems.

Referring to the drawing, there is shown a station in a space radio communication system employing apparatus which embodies my invention, it being understood that the other stations of the system are provided with similar apparatus.

The apparatus may be divided into a receiver or receiving portion, a transmitter or transmitting portion including means for transmitting a distinctive call signal, switching means, and a call signal detector portion.

High voltage direct current energy is supplied to the apparatus from a source not shown, whose positive terminal is designated by the reference character B(+) and the negative terminal of which is grounded. In order to clarify the drawing, the circuits for supplying energy to the heaters of the various electron tubes have not been shown.

The receiving portion of the equipment comprises a receiving antenna RA, demodulator amplifier DA, an output amplifier OA, and a loud speaker LS, and this portion of the equipment is arranged in any of the well-known manners to provide reception of incoming signals. For example, the demodulator amplifier DA may be of the superheterodyne type, and it may be suitable for detecting any type of modulation, such as, for example, amplitude modulation or frequency modulation, depending on the system with which it is used. High voltage direct current energy is supplied to the demodulator amplifier DA by a circuit including contact 9 of push button PB in its released position, so that the demodulator amplifier DA is normally energized. The output amplifier OA is continuously energized, so that at this time incoming signals picked up by the receiving antenna RA are demodulated and amplified by the demodulator amplifier DA, and supplied through the output amplifier OA to the loud-speaker LS, to thereby reproduce any incoming signals.

The transmitting portion of the equipment comprises a transmitter T, which supplies energy to a transmitting antenna TA, a call signal oscillator CSO, a microphone MIC, and a selector switch SL. The transmitter may be of any suitable type, and may be modulated in any manner, such as by frequency modulation or amplitude modulation depending on the system with which it is used, as previously explained in connection with the receiving equipment. The transmitter is modulated by the microphone MIC, or by the call signal oscillator CSO, as selected by a contact 13 of the selector switch SL. High voltage energy is supplied to the transmitter for the operation thereof by a circuit which includes a contact 15 of the selector switch SL in its lowermost position, or by a circuit including contact 15 of selector switch SL in its upper position, and contact 7 of the push button PB and which circuit connects the transmitter to an electronic switch ES, to be subsequently described, so that energy is supplied therefrom to the transmitter T. It will be seen therefore, that the transmitter T is normally rendered inactive, while the receiver portion of the equipment is rendered active. Although separate transmitting and receiving antennas are shown, it is to be understood that a single antenna may be employed for transmission and reception.

The switching portion of the equipment includes the "push-to-talk" button PB, and an electronic switch ES which may be of any suitable type, such as a multivibrator or other well known electronic switching circuits. It is deemed sufficient to explain for the purposes of this disclosure that the electronic switch ES, which is continuously operative, is constructed and arranged to provide pulses of energy at recurrent intervals, which may be supplied therefrom alternately to the receiver portion of the equipment or the transmitter portion of the equipment, and that these pulses are of magnitude sufficient to operate the receiver and transmitter. It is to be understood that means other than electronic switching means may be used, for example, a motor driven commutator arrangement may be substituted with equal facility. The equipment is arranged and constructed so that the electronic switch supplies pulses over the connection 17 which may be, for example, of the order of one milli-second in length, spaced at intervals of the order of one tenth of a second and energy is supplied over connection 19 continuously except during the time in which the positive pulses are supplied over connection 17. That is, a short pulse of energy is supplied over connection 17 at the same time that energy is removed for a like interval of time from the connection 19, so that when the push button PB is depressed, energy is recurrently supplied to the demodulator amplifier DA for short intervals of time, and during these intervals, the supply of energy to the transmitter T over the connection 19 is interrupted.

The call signal detector portion of the equipment comprises an isolating amplifier IA, a band-pass filter BPF which is tuned to the frequency of the call signal oscillator CSO, a detector tube VT1, a call signal filter CSF, a pedestal tube VT4, a warning tone gate, comprising the vacuum tubes VT2 and VT3, here shown as being contained in a single envelope, and a warning tone oscillator WTO. It is believed that the call signal detector portion of the equipment can best be understood from a description of operation of the apparatus.

In describing the operation of the equipment shown in the drawing, it will first be assumed that the equipment is in its normal or receiving condition, as shown. At this time, the transmitter T is inactive, since no energy is supplied thereto from the high voltage source. Energy is supplied to the demodulator amplifier DA over contact 9 of push button PB in its released position, so that incoming signals are picked up by the receiving antenna RA, demodulated and amplified by the demodulator amplifier DA, and supplied through the output amplifier OA to the loud speaker LS. The demodulated and amplified signals are also supplied to the isolating amplifier IA which is connected in multiple with the output amplifier OA, but the amplified signal supplied through the isolating amplifier IA to the band-pass filter BPF is rejected, since the band-pass filter BPF rejects normal speech frequencies and thus the remainder of the call signal detector equipment is not operated by ordinary incoming speech modulated signals. At this time also the electronic switch ES is operating, but the contacts 9 and 7 of push button PB interrupt the circuits for controlling the receiver demodulator amplifier DA and the transmitter T by the electronic switch.

If the operator desires to transmit a message, he depresses the "push-to-talk" button PB and speaks into the microphone MIC. When the push button PB is depressed it cuts off the continuous supply of energy to the demodulator amplifier DA, and establishes a connection over contact 9 to supply energy from the electronic switch ES to the demodulator amplifier DA. Additionally, energy is supplied from the electronic switch ES to the transmitter T by the circuit including the operated contact 7 of the push button PB, and contact 15 of switch SL in its normal position.

The modulation produced by the operator speaking into the microphone MIC is supplied to the transmitter T over contact 13 of selector switch SL in its normal position, and as a result the transmitter is modulated by the voice frequency energy in accordance with the intelligence to be transmitted. As previously explained, the energy supplied to the transmitter T from the electronic switch ES over the circuit including the connection 19 is such that the transmitter is in operation except for extremely short intervals of time, so that the transmission of the transmitter T may be considered as being recurrently interrupted for extremely short intervals. At the same time the energy supplied from the electronic switch ES over the connection 17 and contact 9 of push button PB to the demodulator amplifier DA is such that the demodulator amplifier DA is inactive except for short intervals of time which coincide with the intervals of time during which the transmitter T is inactive. From the foregoing it will be seen that when the station is transmitting the transmitter and receiver are alternately switched on and off, the intervals during which the transmitter is switched off being extremely short as compared to the intervals it is switched on so that at a receiving station, the momentary interruption in the transmission of the sending station will not be noticeable by the person receiving the message, due to the persistence of hearing.

It will now be assumed that with a first station transmitting, a second station desires to break in on the transmission with an emergency message. Accordingly, the operator at the second station operates the selector switch SL of his station to its lowermost position. Steady high voltage energy is now supplied over contacts 15 and 21 of the selector switch SL to the transmitter T and to the call signal oscillator CSO, and the modulation circuit of the transmitter is shifted from the microphone MIC to the output of the call signal oscillator CSO by contact 13 of the selector switch SL. As a result, a continuous call signal is radiated from the transmitting antenna TA, having a modulation frequency determined by the call signal oscillator CSO, which may be, for example, 3000 cycles per second.

At the first station, during the intervals in which the transmitter is switched off and the receiver switched on, the radiated call signal transmitted from the second station is picked up by the receiving antenna RA and is amplified and demodulated by demodulator amplifier DA during its active periods. The resulting pulses of energy having a frequency equal to the call frequency signal are amplified and supplied to the loud-speaker LS to thereby produce short bursts of a high pitched tone in the loud-speaker. As previously explained, the station may be located in a noisy surrounding, such as a locomotive cab, so that it is possible that the brief high pitched signals might not be heard by the operator, especially if the gain control of the output amplifier was set for low output. Accordingly, the call signal detector of my invention provides for detecting the short pulses of the incoming emergency call signal and utilizes the signal pulses to produce a warning tone which is supplied to the loud-speaker LS and is of sufficient volume and frequency to be readily noticed by the operator at the station. The demodulated and amplified call signal is supplied to the isolating amplifier IA by the connection in multiple with the output amplifier OA. This signal is amplified and passed to the band pass filter BPF, which is tuned to the frequency of the call signal oscillator in the case cited, for example, 3000 cycles per second. Accordingly, the 3000 cycle signal which is in the form of short pulses is passed to the detector tube VT1, where the signal is detected or rectified. The envelope of the rectified signal is derived by the call signal filter CSF, here shown as a low pass filter, but which may be tuned to the repetition frequency of the incoming pulses. The resulting envelope is differentiated to produce positive and negative pulses by the differentiating network which includes resistors R1, R2 and condenser C1. The pulses resulting from the start of each envelope are negative and are passed by rectifier K1, here shown as an asymmetric unit, such as a copper oxide rectifier element, to the grid 31 of vacuum tube VT2, which with vacuum tube VT3 constitutes the warning tone gate. The warning tone gate is a type of electronic switch known as a univibrator, or so called one shot multivibrator, well known in the art, which is characterized by having a stable state and an unstable state. The parts are so disposed that when a negative pulse is applied to the grid 31 of vacuum tube VT2, the univibrator changes from its stable state to its unstable state. The interval of time in which it remains in its unstable state is determined by the circuit parameters, and after this predetermined interval, the univibrator reverts to its stable state, the period being determined by adjustment of the variable resistor R3. The output of the warning tone gate is taken from the plate 33 of the tube VT2 and is a square positive impulse, initiated when a negative impulse is supplied to the grid 31 of the tube VT2, and terminated by the univibrator restoring to its normal state.

The square positive output pulses from the warning tone gate are supplied to the warning tone oscillator WTO by the connection 37. The warning tone oscillator WTO may take any form and it is deemed sufficient to explain that when the positive square output pulses are supplied thereto, a tone is generated by the warning tone oscillator for the duration of the pulse. The audio frequency energy generated by the warning tone oscillator is supplied to the loud-speaker LS over the connections 41 and 43, so that a warning tone is produced in the loud-speaker LS, to thereby call the attention of the operator at the first station to the fact that a second station desires to break in on his transmission.

When an emergency call signal is received at stations which are in the normal or receiving condition, the demodulator amplifier DA is continuously energized at this time, so that the call signal is reproduced as a continuous high pitched tone by the loud-speaker LS. However, to insure that the operator at the station in question will be warned of the emergency transmission, and to provide similarity of operation, the apparatus is arranged to provide a locally-generated audible warning signal in a manner similar to that previously described.

As previously explained, the electronic switch ES operates continuously and it is disposed for pulses of positive polarity to be supplied therefrom to the grid 45 of the pedestal tube VT4. This tube is normally cut off by applying a positive bias potential to its cathode 47 from the voltage divider constituted by resistors R1, R9 and R13 connected between terminal B(+) and ground. When an incoming emergency call signal is received, it is passed by the isolating amplifier IA and the band-pass filter BPF to the detector tube VT1. Accordingly, the plate potential of vacuum tube VT1 falls and results in a lowering of the potential of the cathode of the pedestal tube VT4 so that tube VT4 is rendered conductive each time that a positive pulse is supplied from the electronic switch to the grid 45. As a result, the plate potential of the pedestal tube VT4 is pulsed negatively due to the inherent phase shift of the tube, and these negative pulses are passed by the rectifier K2 to the grid 31 on the warning tone gate tube VT2.

Each negative pulse trips the warning tone gate, and as a result causes the warning tone oscillator to supply relatively long pulses of audio frequency energy to the loud-speaker LS where the pulses are audibly reproduced to provide a warning signal in the same manner as previously described.

The warning tone gate may have a period which varies over a wide range of times, with a lower limit determined by the ability of the user to hear the warning tone adequately, and the upper limit being set just enough under the repetition interval of the triggering pulses to permit the univibrator to reset before the next triggering pulse is received. A preferred length of period might be of the order of one-half the repetition interval.

It is to be noted that the emergency calling signal is sent out as a continuous signal, rather than a series of interrupted transmissions, so that the equipment at a station which is transmitting will be certain to pick up the signal. If the calling signal were to be sent out as a series of interrupted pulses controlled by the electronic switch ES, the condition could occur in which the electronic switch at the station which wished to break in and the electronic switch at the station which was transmitting would be in synchronism in such a manner that the incoming emergency call signals would be present at the time that the receiver was rendered inactive so that the incoming call signal would not be detected.

From the foregoing it will be seen that my invention provides a reliable emergency break-in system for a single frequency channel communication system which does not interfere with the normal operation of the equipment, and also provides for fast and reliable break-in operation.

Although I have herein shown and described only one form of communication system embodying my invention, it is to be understood that various changes and modifications may be made therein within the scope of the appended claims without departing from the spirit and scope of my invention.

Having thus described my invention, what I claim is:

1. In a station for a communication system employing a single frequency channel, the combination comprising a transmitter for transmitting at said single frequency, said transmitter being arranged to be selectively modulated by the intelligence to be transmitted or modulated by a distinctive call signal frequency, a receiver comprising a demodulator amplifier for demodulating and amplifying incoming signals, an output amplifier for amplifying the demodulated signals, manual control means for switching between transmission and reception, continuously operative switching means effective when said manual control means conditions the equipment for transmission for recurrently deactivating said transmitter and activating said receiver for a short time interval each of said intervals being relatively short compared to the period between intervals, and call signal detector means operative when a signal modulated by said call signal frequency is received for supplying distinctive audio frequency energy to said loud-speaker to thereby produce a distinctive call signal.

2. In a station for a communication system employing a single frequency channel and comprising a transmitter arranged to be selectively modulated by the intelligence to be transmitted or modulated by a distinctive call signal frequency, a receiver comprising a demodulator amplifier for demodulating and amplifying incoming signals, an output amplifier and a sound reproducer for audibly reproducing the incoming signal, and manually controlled means for at times conditioning the apparatus for transmitting and at other times conditioning the apparatus for receiving, the combination with the foregoing of a first continuously operating electronic switch effective at said times for recurrently activating said receiver and deactivating said transmitter for a time interval which is short relative to the time between said intervals, selecting means effective when operative to continously activate said transmitter independently of said manually controlled means and said electronic switch and to cause said transmitter to be modulated by said distinctive call signal frequency, and call signal detector means responsive to the reception of an incoming signal modulated at said distinctive call frequency for causing said sound reproducer to provide a distinctive audible warning, said call signal detector means comprising a filter connected in multiple with said output amplifier and selectively responsive to said distinctive call signal frequency, a second electronic switch having a stable state and an unstable state, said unstable state having a period longer than said time intervals, a warning tone oscillator the output of which is supplied directly to said sound reproducer independently of said output amplifier, and means including said filter for recurrently tripping said second electronic switch in response to energy of said distinctive call frequency supplied from said filter, said warning tone oscillator being governed by said second electronic switch.

3. In a single frequency channel communication system station having a transmitter and a receiver operable on said frequency channel on a "push-to-talk" basis by means of a "push-to-talk" switch, said transmitter being arranged to be modulated by intelligence to be transmitted and said receiver being arranged to reproduce the intelligence received at a loud-speaker, the combination comprising, means to at times modulate said transmitter by a given call signal frequency, automatic switching means, means governed by said "push-to-talk" switch when set for transmission to render said automatic switching means effective to recurrently deactivate said transmitter and activate said receiver for time intervals which are short compared to the period between intervals, and call signal detector means governed by said receiver and responsive to received energy of said given call signal frequency during said short time intervals to supply to said loud-speaker audio frequency energy of distinctive type at recurrent intervals greater than said short intervals.

4. In a single frequency channel communication system station having a transmitter and a receiver operable on said frequency channel on a "push-to-talk" basis by means of a "push-to-talk" switch, said transmitter being arranged to be modulated by intelligence to be transmitted and said receiver being arranged to reproduce the intelligence received at a loud-speaker, the combination comprising, means to at times modulate said transmitter by a given call signal frequency, automatic switching means, means governed by said "push-to-talk" switch when set for transmission to render said automatic switching means effective to recurrently deactivate said transmitter and activate said receiver for short time intervals which are short compared to the period between intervals, and a call signal detector means including a warning tone oscillator having connection to said receiver and responsive to energy of said given call signal frequency received during said short time intervals to actuate said warning tone oscillator at recurrent intervals, and said warning tone oscillator connected to said loud-speaker to sound a distinctive audible signal when said call signal frequency energy is received.

5. In a single frequency channel communication system station having a transmitter and a receiver operable on said frequency channel on a "push-to-talk" basis by means of a "push-to-talk" switch, said transmitter being arranged to be modulated by intelligence to be transmitted and said receiver being arranged to reproduce the intelligence received at a loud speaker, the combination comprising, means to at times modulate said transmitter by a given call signal frequency, automatic switching means, means governed by said "push-to-talk" switch when set for transmission to render said automatic switching means effective to recurrently deactivate said transmitter and activate said receiver for short time intervals which are short compared to the period between intervals, a call signal detector means including a band-pass filter and a call signal filter connected to said receiver to receive energy therefrom, said band-pass filter to pass energy of said given frequency only, said call signal filter to pass energy having a frequency equal to the repetition of said short time intervals, and means including a warning tone oscillator controlled by said call signal detector means and having connection to said loud-speaker to sound a warning signal when energy of said call signal frequency is received during said short time intervals.

6. In a single frequency channel communication system station having a transmitter and a receiver operable on said frequency channel on a "push-to-talk" basis by means of a "push-to-talk" switch, said transmitter being arranged to be modulated by intelligence to be transmitted and said receiver being arranged to reproduce the intelligence received at a loud speaker, said "push-to-talk" switch normally set to activate said receiver and deactivate said transmitter, the combination comprising a continuously active automatic switching means operable at times to alternately activate and deactivate said receiver and transmitter in a cyclic manner, a selector switch operable independent of said "push-to-talk" switch and said automatic switching means to activate said transmitter and to modulate it by a given call signal frequency, a call signal detector means including a band-pass filter connected to said receiver to receive energy therefrom, said band-pass filter to pass energy of said given frequency only, an electronic switch including a pair of electron tubes connected to have a stable and an unstable condition, means including another electron tube controlled jointly by said call detector means and said automatic switching means and having connection to said electronic switch to recurrently trip the electronic switch when energy of said call signal frequency is received with said "push-to-talk" switch at its normal position, and means including a tone oscillator controlled by said electronic switch and having connection to said loudspeaker to sound an audible signal.

7. In a single frequency channel communication system station having a transmitter and a receiver operable on said frequency channel on a "push-to-talk" basis by means of a "push-to-talk" switch, said transmitter being arranged to be modulated by intelligence to be transmitted and said receiver being arranged to reproduce the intelligence received at a loud-speaker, the combination comprising, means to at times modulate said transmitter by a given call signal frequency, automatic switching means, means governed by said "push-to-talk" switch when set for transmission to render said automatic switching means effective to recurrently deactivate said transmitter and activate said receiver for time intervals which are short compared to the period between intervals, call signal detector means having connections to said receiver to receive a portion of the received energy and including a filter tuned to pass only energy of said call signal frequency, an electronic switch characterized by a stable and an unstable condition and having connection to said call signal detector means to trip it to its unstable condition in response to a pulse of said call signal energy received during an activated interval of said receiver, and a tone oscillator having connection to said loud-speaker and controlled by said electronic switch when tripped to its unstable condition to sound a warning signal.

ELBERT W. MARLOWE.

REFERENCES CITED

The following references are of record in the file of this patent:

UNITED STATES PATENTS

| Number | Name | Date |
|---|---|---|
| 1,472,897 | Murphy | Nov. 6, 1923 |
| 1,891,299 | Anderson | Dec. 20, 1932 |
| 2,369,230 | Hansell | Feb. 13, 1945 |
| 2,425,495 | Trevor et al. | Aug. 12, 1947 |
| 2,426,581 | Atkins | Sept. 2, 1947 |
| 2,431,167 | Byrnes | Nov. 18, 1947 |